US008687539B2

(12) United States Patent
Tay et al.

(10) Patent No.: US 8,687,539 B2
(45) Date of Patent: Apr. 1, 2014

(54) METHOD OF RELAYED WIRELESS TRANSMISSION

(75) Inventors: Hui M J Tay, Ipswich (GB); Benjamin Bappu, Ipswich (GB); Xie Feng, Hong Kong (CN)

(73) Assignee: British Telecommunications PLC, London (GB)

(*) Notice: Subject to any disclaimer, the term of this patent is extended or adjusted under 35 U.S.C. 154(b) by 1104 days.

(21) Appl. No.: 12/281,392

(22) PCT Filed: Feb. 28, 2007

(86) PCT No.: PCT/GB2007/000703
§ 371 (c)(1),
(2), (4) Date: Sep. 2, 2008

(87) PCT Pub. No.: WO2007/104920
PCT Pub. Date: Sep. 20, 2007

(65) Prior Publication Data
US 2009/0028086 A1    Jan. 29, 2009

(30) Foreign Application Priority Data
Mar. 16, 2006  (EP) .................................... 06251422

(51) Int. Cl.
 *H04B 7/14*  (2006.01)
 *G01R 31/08*  (2006.01)
(52) U.S. Cl.
 USPC .......................................... 370/315; 370/246
(58) Field of Classification Search
 USPC ....................................................... 370/315
 See application file for complete search history.

(56) References Cited

U.S. PATENT DOCUMENTS

| 5,917,811 | A  | * | 6/1999  | Weaver et al. ............... 370/332 |
| 6,097,703 | A  |   | 8/2000  | Larsen et al. |
| 6,160,999 | A  | * | 12/2000 | Chheda et al. ................ 455/69 |
| 6,496,696 | B1 | * | 12/2002 | Melnik ....................... 455/446 |
| 6,718,159 | B1 |   | 4/2004  | Sato |
| 6,798,765 | B2 | * | 9/2004  | Larsson ....................... 370/351 |

(Continued)

FOREIGN PATENT DOCUMENTS

| EP | 1 170 901    | 1/2002 |
| EP | 1 170 901 A2 | 1/2002 |

(Continued)

OTHER PUBLICATIONS

International Search Report for PCT/GB2007/000703, mailed Mar. 4, 2007.

(Continued)

*Primary Examiner* — Gerald Smarth
(74) *Attorney, Agent, or Firm* — Nixon & Vanderhye, P.C.

(57) ABSTRACT

A light-weight relay selection mechanism selects the most likely "best" relay station for data transmission from a given source station S to an access point AP using the Initial Receive Signal Strength (IRSS) to infer the future data transmission rate. In the initialization stage, the access point AP constructs a table mapping the IRSSs of receivers to eight levels of transmission rate. In the relay selection stage, relay candidates R measure the IRSSs for the source station S and access point AP and report their IRSS levels to the AP. A contention-based mechanism is dedicated to enabling the candidate with higher IRSS levels to report earlier. With this mechanism, the access point AP is able to select the station with the highest estimated data transmission rate.

16 Claims, 4 Drawing Sheets

Stations send IRSSM frames to AP at different times

(56) References Cited

U.S. PATENT DOCUMENTS

| | | | |
|---|---|---|---|
| 7,092,378 B1* | 8/2006 | O'Neil | 370/351 |
| 7,590,061 B2* | 9/2009 | Barry et al. | 370/230 |
| 7,653,700 B1* | 1/2010 | Bahl et al. | 709/217 |
| 7,835,384 B2* | 11/2010 | Furuskar et al. | 370/445 |
| 7,873,343 B2* | 1/2011 | Gollnick et al. | 455/343.3 |
| 2002/0051425 A1* | 5/2002 | Larsson | 370/252 |
| 2003/0179721 A1* | 9/2003 | Shurmantine et al. | 370/315 |
| 2004/0156399 A1* | 8/2004 | Eran | 370/913 |
| 2004/0166852 A1* | 8/2004 | Backers et al. | 455/434 |
| 2005/0053025 A1* | 3/2005 | Duffy et al. | 370/315 |
| 2005/0124345 A1* | 6/2005 | Laroia et al. | 455/437 |
| 2005/0153719 A1* | 7/2005 | Bims | 455/466 |
| 2005/0201278 A1* | 9/2005 | Banerjee et al. | 370/229 |
| 2006/0268903 A1* | 11/2006 | Feng | 370/401 |

FOREIGN PATENT DOCUMENTS

| | | |
|---|---|---|
| EP | 1 545 062 | 6/2005 |
| EP | 1 545 062 A2 | 6/2005 |
| WO | WO2006/095148 A1 | 9/2006 |

OTHER PUBLICATIONS

H. Zhu and G. Cao, "On Improving the Performance of IEEE 802.11 with Relay-Enabled PCF," ACM/Kluwer Mobile Networks and Applications (MONET), 2004.

H. Zhu and G. Cao, "rDCF: A Relay-Enabled Medium Access Control Protocol for Wireless Ad Hoc Networks"; IEEE Transactions on Mobile Computing, vol. 5, Issue 9, Sep. 2006 pp. 1201-1214.

A. Bletsas, A. Lippman and David P. Reed, "A Simple Distributed Method for Relay Selection in Cooperative Diversity Wireless Networks, based on Reciprocity and Channel Measurements," IEEE 61$^{st}$ Semiannual VTC, vol. 3, May 30-Jun. 1, 2005 pp. 1484-1488, Stockholm Sweden.

B. Bappu and J. Tay, "Improving uplink QoS of Wifi hotspots," 13$^{th}$ IWQoS, Jun. 21-23, Passau, Germany, 2005.

Van Sreng, Halim Yanikomeroglu, and David D. Falconer, "Coverage Enhancement through Two-hop Relaying in Cellular Radio Systems," IEEE Wireless Communications and Networking Conference (WCNC'02), Mar. 17-21, 2002, Orlando, FL, USA.

* cited by examiner

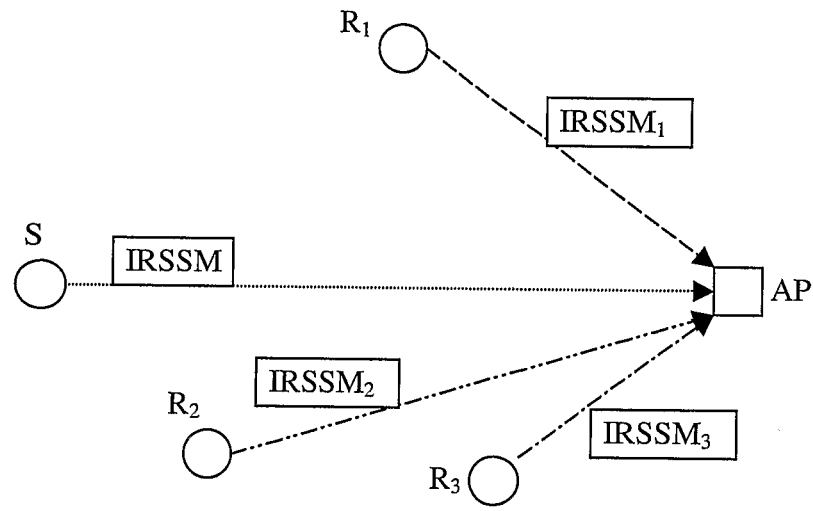
Figure 1 Stations send IRSSM frames to AP at different times
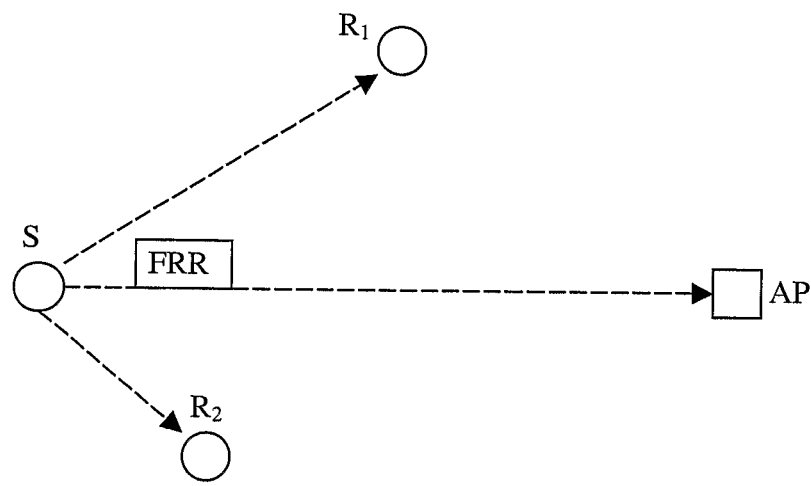
Figure 2 Source Station sends FRR

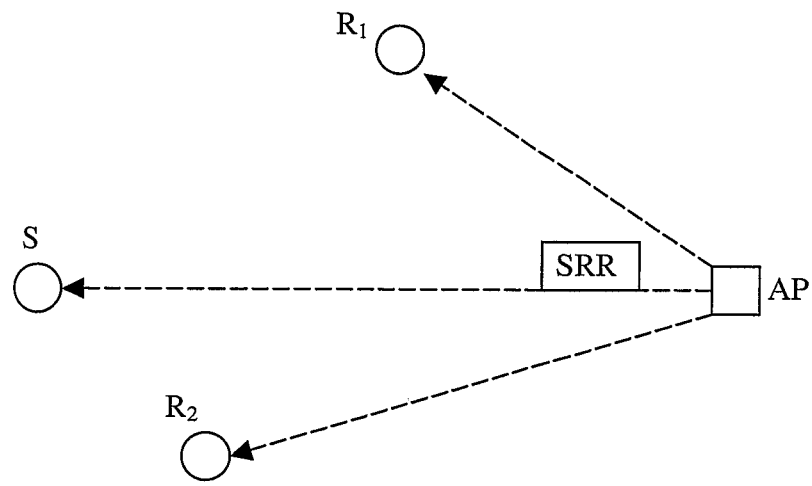
Figure 3 AP sends the SRR frame
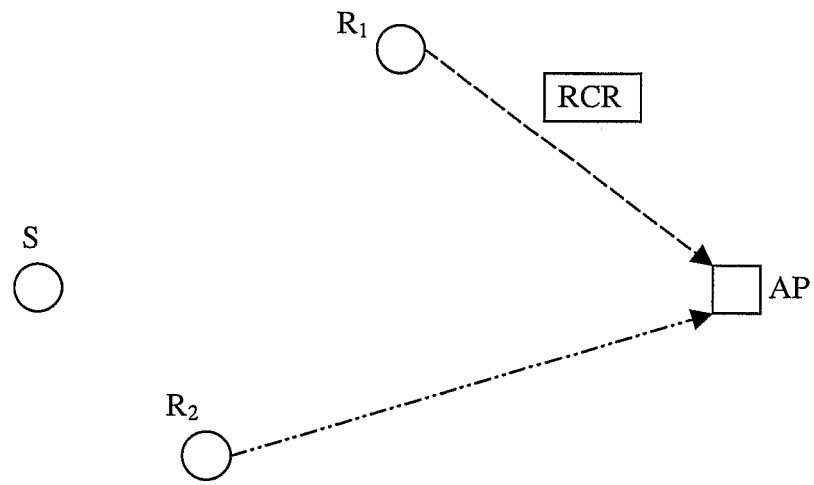
Figure 4 Relay candidates compete for sending RCR frames

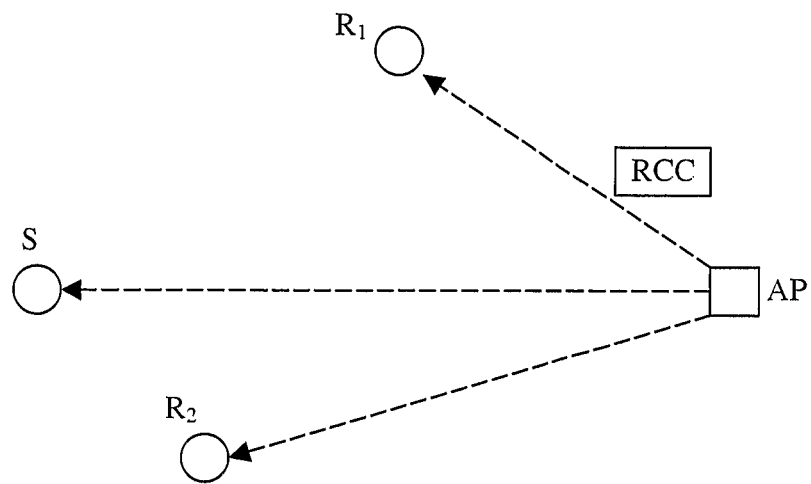
Figure 5 AP sends RCC frame.
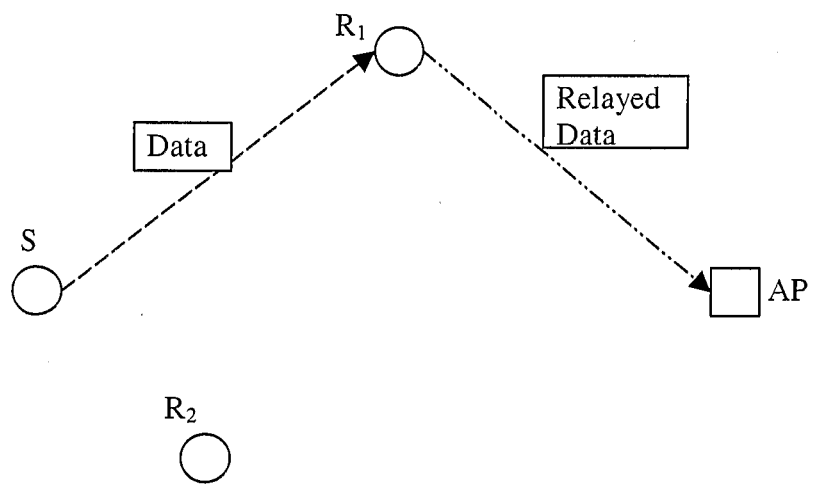
Figure 6 S starts to transmit data

| $R_1$ | $R_2$ | S | AP |
|---|---|---|---|
| | | Send FRR | |
| Receive FRR<br>Measure IRSS[S->$R_1$] | Receive FRR<br>Measure IRSS[S->$R_2$] | | Receive FRR<br>Measure IRSS[S->AP]<br>translate to IRSSL[S->AP] |
| | | | Send SRR with IRSSL[S->AP] and IRSSC |
| Receive SRR<br>Use IRSSC to obtain IRSSL[S->$R_1$] from IRSS[S->$R_1$]<br>Measure IRSS[AP->$R_1$]<br>Use IRSSL to obtain IRSSL[AP->$R_1$] from IRSS[AP->$R_1$] | Receive SRR<br>Use IRSSC to obtain IRSSL[S->$R_2$] from IRSS[S->$R_2$]<br>Measure IRSS[AP->$R_2$]<br>Use IRSS to obtain IRSSL[AP->$R_2$] from IRSS[AP S->$R_2$] | | Wait<br>If timeout before receiving any RCR, send RCC indicating direct transmission. |
| Calculate E = min(IRSSL[S->$R_1$], IRSSL[AP->$R_1$])<br>Choose backoff limits as function of E.<br>Choose random wait time t within these limits.<br>Wait t | Calculate E = min(IRSSL[S->$R_2$], IRSSL[AP->$R_2$])<br>Choose backoff limits as function of E.<br>Choose random wait time t within these limits.<br>Wait t | | |
| Send RCR with IRSSL[S->$R_1$] | Send RCR with IRSSL[S->$R_2$] | | Receive RCRs with IRSSL[S->$R_i$]<br>Measure IRSS[$R_i$->AP]<br>translate to IRSSL[$R_i$->AP]<br>Compute $Sig_i$[S->AP], $Insig_i$[S->AP]<br>Select relay j with largest Sig |
| Receive RCC nominating as relay: prepare to relay data.<br>OR<br>Receive RCC nominating another station (or no station) as relay: cease relay reporting. | | Receive RCC.<br>Transmit data to relay j or direct to AP. | If IRSSL[S->AP] > IRSSL[S->AP] send RCC nominating j as relay.<br>Otherwise, sendRCC indicating direct transmission. |

Figure 7

METHOD OF RELAYED WIRELESS TRANSMISSION

This application is the U.S. national phase of International Application No. PCT/GB2007/000703 filed 28 Feb. 2007 which designated the U.S. and claims priority to EP 06251422.9 filed 16 Mar. 2006, the entire contents of each of which are hereby incorporated by reference.

BACKGROUND

1. Technical Field

The present invention is concerned with wireless transmission, and methods for choosing one of a plurality of candidate stations for participating in such transmission. One particular context of interest is the selection of relay stations in a wireless local area network environment (or, for short, wireless LAN or simply WLAN), especially wireless LANs in accordance with the IEEE 802.11 standard. However the invention may be used in other contexts, too.

2. Related Art

There have been several proposals for implementing multi-hop functionality in an 802.11 WLAN. Most of them perform relaying at the MAC layer. This is essentially because MAC relaying does not include queuing delays and does not affect the relay node transmission opportunity compared with route forwarding. Zhu and Cao proposed two relay based protocols namely, Relay-Enabled PCF and Relay-Enabled DCF. The first of these protocols is described in H. Zhu and G. Cao, "On improving the performance of IEEE 802.11 with Relay-Enabled PCF," ACM/Kluwer Mobile Networking and Applications (MONET), 2004. There, nodes maintain transmit tables that contain notification of channel transmission rate changes by access point (AP). This notification information is frequently piggybacked with packets to cope with channel modification and nodes' mobility. Maintaining tables and frequent notification result in excessive overhead. Relay-Enabled DCF is described in H. Zhu and G. Cao, "rDCF: A Relay-enabled Medium Access Control Protocol for Wireless Ad Hoc Networks," IEEE Trans. on Mobile Computing, 2005. In this proposal, there is the use of rate adaptation that is similar to rPCF. This protocol selects a good relay for transmission but it may not be the best one. Both protocols are proven to achieve good performance results. In the same distributed environment as rDCF, Bletsas et al propose a new method to assess the quality of the channel (see A. Bletsas, A. Lippman and D. P. Reed, "A Simple Distributed Method on Relay Selection in Cooperative Diversity Wireless Networks, based on Reciprocity and Channel Measurements," IEEE 61$^{st}$ Semiannual VTC, May 30-Jun. 1, 2005, Stockholm Sweden). This method is simple and practical because it gives instantaneous feedback of the channel condition. It assumes that the transmission channel in both directions (sending and receiving) is the same, and the nodes have the same power in order to select the best of them comparing only the quality of the channel, i.e. it does not take into account that there is a variety of mobile stations with different power settings in a WLAN.

BRIEF SUMMARY

In previous work by the present inventors, an access point chooses a relay by checking from its table to select the node that is capable of being a relay based on it being able to fulfill a minimum received signal strength, and it uses less transmit power than other relay nodes. See our international patent application PCT/GB2006/000780, and B. Bappu and J. Tay, "Improving uplink QoS of Wifi hotspots," 13th IWQoS, Jun. 21-23, Passau, Germany, 2005.

According to the present exemplary embodiment there is provided a method of transmission between a first station and a second station via one of a plurality of relay stations, comprising (a) sending at least one transmission to the relay stations;

(b) at each relay station, measuring the received signal and transmitting a report of this measurement to one of the first and second stations;

(c) upon receipt of the reports, choosing a relay station to be used, based on said measurements;

characterized in that each relay station selects, based on its measurement, a time to transmit its report, such that the more favorable reports are transmitted more expeditiously than less favorable reports.

In another aspect, the exemplary embodiment provides a method of choosing a station from a plurality of candidate stations for participation in a wireless link, comprising (a) sending at least one transmission to the candidate stations;

(b) at each candidate station, measuring the received signal and transmitting a report of this measurement;

(c) upon receipt of the reports, choosing a candidate station to be used, based on said measurements;

characterized in that each candidate station selects, based on its measurement, a time to transmit its report, such that the more favorable reports are transmitted more expeditiously than less favorable reports.

Other aspects of the exemplary embodiment are set out in the claims.

BRIEF DESCRIPTION OF THE DRAWINGS

FIG. 1 is a schematic diagram of a wireless LAN;

FIGS. 2-6 show signal paths in the LAN of FIG. 1; and

FIG. 7 represents a flow chart of a relay selection process.

DETAILED DESCRIPTION OF EXEMPLARY EMBODIMENTS

Some embodiments of the invention will now be described, by way of example, with reference to the accompanying drawings.

FIG. 1 is a schematic diagram of a wireless LAN operating according to the IEEE 802.11 standard. A base station, or access point, AP is provided, and has a radio transceiver which communicates with a radio transceiver in each of a number of terminal devices S (only one of which is, however, shown in the drawing). Also shown are relay stations $R_1$, $R_2$, $R_3$. When conditions are poor, a device S (referred to as source, may transmit via a relay to the AP, rather than directly, in order to obtain a stronger signal and hence a higher data rate. In this version, the relays are dedicated relay stations, but the relay functionality could, if desired, be provided in the terminal devices S.

There is a strong correlation between path loss and the achievable transmission rate for sending data. Both distance and obstacles produce fading effects that contribute to path loss. Given that other conditions remain unchanged, the transmission rate decreases with path loss. So we try to use path loss as a parameter for estimating the approximate transmission rate that a source mobile station can achieve with a relay station. In order to determine which relay station to use, measurements of received signal strength are made. As will be described in more detail below, this is achieved by sending a test transmission, at full power and at the lowest data rate, and measuring the initial received signal strength (IRSS). Now, this measurement could if desired be used directly: however, we prefer to translate the measured IRSS values into an index IRSSL (0 to 7) each corresponding to a band of IRSS values. Moreover, we prefer to adaptively adjust these bands based on observed conditions, in order that each band corresponds to an expected one (or, occasionally, more than one) of a set of discrete data rates that are in use in the system.

This requires a mapping table, which is set up in an initiation phase. When a mobile station S first joins the wireless "hot spot" serviced by the access point AP (or prior to sending data), it sends a frame at full power and at the lowest rate. Any frame which is sent with full power and at the lowest rate, such as Request to Send (RTS), can be considered as an Initial Receive Signal Strength Management (IRSSM) frame for this purpose. Upon receiving the IRSSM frame, the access point AP measures the IRSS in dBm and keeps a list of stations with various IRSSs.

When a station in the list sends data (directly without a relay) to it, the access point AP records the transmission rate (TR) that the station uses most of the time. This of course requires that the station adapts its data rate to make the best use of the available channel. In 802.11, the system rates are 1, 2, 5.5, 6, 9, 11, 12, 18, 24, 36, 48, 54, but in fact we reduce the number of categories slightly: 6 and 9 Mbps are recorded as 5.5 Mbps, while 12 and 18 Mbps are recorded under the category of 11 Mbps. Other TR values are recorded as they are. Thus, the recorded TR will fall into one category of the following set {1, 2, 5.5, 11, 24, 36, 48, 54}. The recorded rate of each station is kept in the above-mentioned list as well. In this way, the access point AP maintains a list of stations with their IRSSs and TRs. It sorts the records based on TR and finds the average IRSS for each setting of TR. We denote these IRSSs as IRSS(1), IRSS(2), IRSS(5.5), IRSS(11), IRSS (24), IRSS(36), IRSS(48) and IRSS(54).

It is expected that: IRSS(1)<IRSS(2)<IRSS(5.5)<IRSS (11)<IRSS(24)<IRSS(36)<IRSS(48)<IRSS(54).

There are 8 levels of IRSS corresponding to 8 levels of transmission rates. The access point AP periodically updates the list and recalculates IRSS(1) to IRSS(54). Table 1 shows the structure of the mapping table, and also shows the corresponding indices IRSSL.

TABLE 1

| IRSSL | IRSS (dBm) | Expected transmission rate (Mb/s) |
|---|---|---|
| 0 | | 1 |
| 1 | | 2 |
| 2 | | 5.5 |
| 3 | | 11 |
| 4 | | 24 |
| 5 | | 36 |
| 6 | | 48 |
| 7 | | 54 |

The process of relay selection is shown in the flowchart of FIG. 7, whilst the paths followed by the signals are shown in FIGS. 2 to 6. Four types of frames are needed: First Relay Request (FRR), Second Relay Request (SRR), Relay Candidacy Report (RCR), and Relay Candidacy Confirm (RCC). All these types of frames except SRR share the same format: as well as the identities of the sender and addressee, 3 bits are used for identifying the frame type and 3 bits are used for carrying the IRSS Level (IRSSL). For example, 000 for IRSS (1), 001 for IRSS(2), 010 for IRSS(5.5), 011 for IRSS(11), 100 for IRSS(24), 101 for IRSS(36), 110 for IRSS(48), and 111 for IRSS(54). In other words, there are 8 levels of IRSS.

IRSSL ranges from 0 to 7. All IRSS values are mapped to the 8 IRSSLs. Any IRSS value between two levels of IRSS will be recorded with the lower level.

A SRR frame also includes, besides the frame type field and IRSSL field, an IRSS Classification (IRSSC) field. This field contains 8 bytes with each byte showing the IRSS in dBm from IRSS(1) to IRSS(54). Other stations receiving the SRR frame can use the data contained in the IRSSC field to map their IRSS measurements to IRSSL values.

When a station S wants to use relay functions, it sends a First Relay Request (FRR) frame at full power and the lowest rate, as shown in FIG. 2. It does not need to set the IRSSL bits.

Upon receiving the FRR frame, the access point AP measures the IRSS for the link S→AP and (FIG. 3) sends a Second Relay Request (SRR) frame at full power and lowest rate. The IRSSL bits in the SRR frame are set according to the measured IRSS for link S→AP (note that this is optional, as these data are, in this version, not used by the relay station. The IRSSC field is also included in the SRR frame.

Upon receiving the FRR frame, a relay candidate, denoted by R_i, measures the IRSS for the link S→R_i. Upon receiving the SRR frame from the access point AP, the relay R_i measures the IRSS for the link AP→R_i. These measurements IRSS[S→R_i] and IRSS[AP→R_i] are translated into the corresponding indices IRSSL[S→R_i] and IRSSL [AP→R_i] using the mapping data in the IRSSC field contained in the SRR frame.

After receiving the SRR frame, relay candidates need to transmit the Relay Candidacy Reports (RCR) to the AP with IRSSL[S→R_i] recorded in the IRSSL field of the RCR frame (FIG. 4). In order to avoid collision of these reports with those from other candidates, the relay station waits for a randomly selected waiting period. However, in order that reports from promising candidates—that is, those with high signal strength measurements—should be received expeditiously, these are given shorter waiting times. This is achieved by providing that the waiting time is randomly chosen within a range. We will return later for an explanation of how this is calculated.

After sending the SRR frame, the access point AP sets the initial inter-frame space for sending an RCC frame according to the value of IRSSL[S→AP], using the lookup table of Table 2. If the access point AP does not receive any RCR frame before sending the RCC frame, it infers that there are no eligible relay stations. In this case, the RCC frame that the access point AP sends (FIG. 5) confirms direct data transmission without relay.

TABLE 2

Initial IFS settings for sending RCC frame.

| IRSSL[S→AP] | Estimated rate for S→AP (Mb/s) | Initial IFS for sending RCC |
|---|---|---|
| 7 | 54 | DIFS |
| 6 | 48 | DIFS |
| 5 | 36 | DIFS |
| 4 | 24 | DIFS + 31 × SlotTime |
| 3 | 11 | DIFS + 63 × SlotTime |
| 2 | 5.5 | DIFS + 127 × SlotTime |
| 1 | 2 | DIFS + 255 × SlotTime |
| 0 | 1 | DIFS + 511 × SlotTime |

"DIFS" is defined in 802.11 as "distributed interframe space", being the minimum idle time for contention-based services.

By way of a preliminary to explaining the criteria for choosing a relay, suppose the transmission rate chosen by a source station is denoted as a, and the rate chosen by the relay station is denoted as b. Both of these affect the end-to-end (source station to access point) transmission rate, denoted by r. The lower rate of the two link rates affects the end-to-end transmission rate most significantly. For some set of available transmission rates, the comparison of r for selecting two different relay stations is determined by the comparison of min(a,b). Given the fact that the number of available transmission rate settings is limited, when two potential relay stations have equal min(a,b), a comparison of max(a,b) is necessary to determine which selection is better.

Mathematical formulation:

$$min(a1,b1)<min(a2,b2) \rightarrow r1<r2$$

$$min(a1,b1)=min(a2,b2) \&\& max(a1,b1)<max(a2,b2) \rightarrow r1<r2$$

An example set of transmission rates is {1, 2, 5.5, 11, 24, 36, 48, 54}

On receiving the RCR frame, with IRSSL[S→R_i], the access point AP measures the IRSS and maps it to IRSSL [R_i→AP]. Then it has both IRSSL[S→R_i] and IRSSL [R_i→AP] for that station. Since the lower one of the two IRSSLs affects the data transmission rate for S—R→AP more significantly, we call min(IRSSL[S—R_i], IRSSL [R_i→AP]) the "significant IRSSL" and max(IRSSL [S→R_i], IRSSL[R_i→AP]) the "insignificant IRSSL". After that, the access point AP goes on to receive more RCR frames. For every reported candidate, the access point AP records its address, IRSSL[S→R_i] and IRSSL[R_i→AP] until one of the following two conditions is met.

(1) the access point AP infers that it is unlikely to receive a report with the significant IRSSL higher than or equal to the highest significant IRSSL of reported candidates. This is achieved by the following method. The access point AP sets the inter-frame space for sending RCC frames according to the highest significant IRSSL. IFS[RCC]=DIFS+upper bound of the back-off window for the highest significant IRSSL. For example, the access point AP waits for DIFS+ 127×SlotTime for sending an RCC frame if the highest significant IRSSL is IRSSL(11).

(2) The number of reported candidates reaches a preset limit (e.g. 5).

For both cases, the access point AP selects the candidate with the highest significant IRSSL as the relay station. For multiple candidates with the same highest significant IRSSL, AP selects the one with the highest insignificant IRSSL. After that, provided that the significant IRSSL for the selected relay station exceeds IRSSL[S→AP], the access point AP transmits an RCC frame to the selected relay station. If, on the other hand, the significant IRSSL for the selected relay station fails to exceed IRSSL[S→AP], this means that the path via the best relay station is no better than (or possibly inferior to) the direct pate and therefore the access point AP sends an RCC frame confirming direct data transmission, without relay. This is necessary to guarantee that the relay function is used only when it brings benefits.

When the selected relay station receives the RCC frame, it prepares to relay data. For all the other relay candidates, when they receive an RCC frame addressed to another relay station, they stop their relay reporting stages no matter whether they have transmitted the reports or not. The station S can then transmit data via the selected relay R to the access point AP (FIG. 6).

Returning now to the setting of the range (upper and lower bounds) for the RCR frame backoff window, ideally we want to give priority to those candidate relay stations with the highest values of significant IRSSL=min(IRSSL[S→R_i], IRSSL[R_i→AP]), but this is not possible: the relay station does not have this information available since IRSSL [R_i→AP] is unknown until the RCR frame reaches the access point AP. The relay station has however measured IRSSL[AP→R_i] which is similar to, but not the same as, IRSSL[R_i→AP], and it uses this to compute an estimated significant IRSSL equal to min(IRSSL[S<R_i], IRSSL [AP→R_i]), and bases its decision on this. There are two time settings for configuring the waiting time, DIFS and back-off window. There are three design goals for the time settings. 1) to let the relay candidates with the highest min(IRSSL [S→R_i], IRSSL[AP→R_i]) to send reports first; 2) keep the contention probability at a low level; 3) to keep the overhead of the contention-based mechanism approximately equal (and also at a low level) for relay stations with different link bandwidths. Table 3 shows the settings in column 3. So we see, for example, that if the estimated significant IRSSL is that corresponding to 11 Mbit/s, then the upper and lower bounds are 127 and 64 slot times (where a "slot time" is as defined in the 802.11 standard). Thus, a relay station with this estimated significant IRSSL chooses a random (or pseudo-random) number in the range 64 to 127 and waits this number of slot times before transmitting the RCR frame.

Table 3 also shows the estimated overhead, which is calculated by multiplying the channel free time incurred by the back-off mechanism and the S→R→AP transmission rate. The overhead shows how many bytes can be transmitted if the channel is fully utilized for data transmission with relay enabled.

TABLE 3

Estimated Overhead for receiving each report (assuming no contention) DIFS = 28 µs; slot time = 9 µs; (802.11 g only mode)

| Actual Rate (Mb/s) | Classified Rate (Mb/s) | Back-off window range (in slot time) | Average Overhead (KB) | Max Overhead (KB) |
|---|---|---|---|---|
| (54, 54) | 54 | [0, 15] | 0.3 | 0.5 |
| (48, ≥48) | 48 | [16, 31] | 1 | 2 |
| (36, ≥36) | 36 | [16, 63] | 1 | 2 |
| (24, ≥24) | 24 | [32, 63] | 1 | 2 |
| (18, ≥18) | 11 | [64, 127] | 2 | 2 |
| (12, ≥12) | 11 | [64, 127] | 1 | 2 |
| (11, ≥11) | 11 | [64, 127] | 1 | 2 |
| (9, ≥9) | 5.5 | [128, 255] | 2 | 2 |
| (6, ≥6) | 5.5 | [128, 255] | 1 | 2 |
| (5.5, ≥5.5) | 5.5 | [128, 255] | 1 | 1 |
| (2, ≥2) | 2 | [256, 511] | 1 | 1 |

Upon receiving the RCC frame, the source station S may start to transmit data. When it transmits the data, it sends data frames to the relay station R with the transmission power and rate adjusted based on the existing power/rate management mechanism designed for no-relay wireless LAN. Under any power/rate management mechanism the transmission rate for S→R→AP could be much higher than S→AP, or the power consumption for S→R→AP could be lower than S→AP. This is the advantages of relaying. S also uses DIFS as the inter-frame space. This relay selection mechanism is fully compatible with the existing power/rate management mechanisms and can be easily applied to existing non-relay solutions.

In relation to the selection of upper and lower bounds, it will be observed that the widows defined in Table 3 are non-overlapping. However, this is not absolutely essential. It would be possible (though not preferred) to have overlapping windows. Even if all the lower bounds were zero, then, provided of course that the upper bounds progressively increase with increasing significant IRSSL, the probability is that, on average, the stations with lower values choose longer waiting times.

It will be seen that, in the system we have described, a relay station is selected before it relays the data continuously. In Bletsas' work (cited above), the relay station is selected "on the fly". That means an on the fly relay station is only responsible for forwarding one frame of data. Although this on the fly mechanism may adapt to network change more promptly, there are two critical disadvantages. (1) Since it is unknown that which relay candidate should relay for the data a priori, all relay candidates must consume receiving power for all the transmitted data although only one station will gain the competence and act as the relay station. Thus, all the power consumption by relay candidates, except the winner, is wasted. (2) As the relay candidates compete for performing the relay function for each transmitted data frame, contention must be avoided and it incurs extra time consumption for each relaying of data. Our work saves the time overhead because extra consumption of time is necessary only for the relay selection phase.

In our previous work, the wireless channel measurement is directly used for relay selection. In the present system, the measurement is classified into a number of levels corresponding to the levels of transmission rates, because measurement differences are accountable for the differences of transmission rates. For this purpose, we have an initialization phase for setting up the mapping table between the measured receiving signal strengths and the levels of transmission rates before the relay selection mechanism is actually invoked.

What is claimed is:

1. A method of transmission between a first station and a second station via one of a plurality of relay stations, said method comprising:
   (a) transmitting at least one signal to a plurality of candidate relay stations for communicating between a first station and a second station;
   (b) at each relay station, measuring a received signal resulting from said transmitted signal and transmitting a report of this measurement to one of the first and second stations;
   (c) upon receipt of the reports, choosing a relay station to be used, based on said measurement;
   (d) the second station transmitting a signal to the relay station;
   (e) each relay station measuring the signal received from the second station; and
   (f) each relay station selecting a time to transmit its report, such that more favorable reports are transmitted more expeditiously than less favorable reports,
   wherein, for each relay station, the time selected to transmit its report is based not only on its measurement of the first received signal, but also on its measurement of the signal transmitted by the second station.

2. A method according to claim 1, in which:
   in (a), the first station transmits the first signal to the relay stations;
   in (b), each of the relay stations transmit the report to the second station; and
   the second station measures the signals received from the relay stations; and
   the second station chooses a relay station to be used, based both on the measurements contained in the reports and on the measurements made at the second station.

3. A method according to claim 1, in which:
   the transmission of the signal by the second station to the relay stations is triggered by the reception at the second station of the signal transmitted by the first station; and
   the transmissions from the relay stations are triggered by reception at the relay station of the signal transmitted by the second station.

4. A method according to claim 1, in which the measurements are of received signal strength.

5. A method according to claim 4, in which each report contains an index indicating within which of a plurality of ranges the received signal strength falls.

6. A method according to claim 5, in which said ranges are adaptively varied in accordance with actual measurements of the correlation between received signal strengths and data rates, such that each range corresponds to a range of signal strengths associated with a respective one or more of discrete data rates.

7. A method according to claim 5, in which each relay station translates its measurements into said index using translation data sent to it with said transmission from the second station.

8. A method according to claim 1, in which, at each relay station, the time selected to transmit its report is chosen in a random or pseudo random manner within a range defined by upper and lower bounds chosen as a function of said measurement(s).

9. A method of transmission between a first station and a second station via one of a plurality of candidate relay stations, said method comprising:
   (a) transmitting at least one signal from at least one of a first station and a second station to each of plural candidate relay stations for relaying of future signals between said first and second stations;
   (b) at each of said plural candidate relay stations, measuring an initial receive signal strength for said signals transmitted from said at least one of first and second stations;
   (c) at each of at least some of said plural candidate relay stations, transmitting a received signal quality report to at least one of said first and second stations based on an initial receive signal quality measured for said signals transmitted from said at least one first and second stations at respectively corresponding different locally selected times such that more favorable reports are transmitted sooner than less favorable reports,
   wherein, for each candidate relay station, the time selected to transmit its report is based on signals received from said at least one first and second stations; and
   (d) selecting one of said candidate relay stations for future signals between said first and second stations at one of said first and second stations based at least in part on a signal quality report received from the selected candidate relay station.

10. The method according to claim 9, wherein:
    the first station transmits a first signal to the relay stations and each of the relay stations transmits its report to the second station; and
    the second station measures the signals received from the relay stations; and
    the second station chooses a relay station to be used, based both on the measurements contained in the reports and on the measurements made locally at the second station.

11. The method according to claim 9, wherein:
    the transmission of the signal by the second station to the relay stations is triggered by the reception at the second station of the signal transmitted by the first station; and the transmissions from each relay station are triggered by reception at that relay station of the signal transmitted by the second station.

12. The method according to claim 9, wherein the measurements of quality include measurement of received signal strength.

13. The method according to claim 12, in which each transmitted quality report contains an index indicating within which of a plurality of ranges the received signal strength falls.

14. The method according to claim 13, in which said ranges are adaptively varied in accordance with actual measurements of correlation between received signal strengths and data rates, such that each range corresponds to a range of signal strengths associated with a respective one or more of discrete data rates.

15. The method according to claim 13, in which each relay station translates its measurements into said index using translation data sent to it with said transmission from the second station.

16. The method according to claim 9, in which, at each relay station, the time selected to transmit its report is chosen in a random or pseudo random manner within a range defined by upper and lower bounds chosen as a function of said measurement(s).

* * * * *

UNITED STATES PATENT AND TRADEMARK OFFICE
CERTIFICATE OF CORRECTION

PATENT NO.        : 8,687,539 B2
APPLICATION NO.   : 12/281392
DATED             : April 1, 2014
INVENTOR(S)       : Tay et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1374 days.

Signed and Sealed this

Twenty-ninth Day of September, 2015

Michelle K. Lee
*Director of the United States Patent and Trademark Office*